May 5, 1964

K. J. THALLER ETAL 3,131,467

METHOD OF EXPLOSIVELY BULGING A TUBE BY A TAPE
WOUND ABOUT AN EXPLOSIVE CHARGE

Filed Oct. 11, 1960

*INVENTORS.*
KENNETH J. THALLER
HAROLD F. WEISENSTEIN &
CHARLES O. WILLIAMS

BY
*ATTORNEYS*

United States Patent Office 3,131,467
Patented May 5, 1964

3,131,467
METHOD OF EXPLOSIVELY BULGING A TUBE BY A TAPE WOUND ABOUT AN EXPLOSIVE CHARGE
Kenneth J. Thalier and Harold F. Weisenstein, St. Louis County, Mo., and Charles O. Williams, Hamden, Conn., assignors to Olin Mathieson Chemical Corporation, East Alton, Ill., a corporation of Virginia
Filed Oct. 11, 1960, Ser. No. 61,955
14 Claims. (Cl. 29—421)

This invention relates to the expansion of tubes and more particularly to the securing of tubular conduits within partition members by explosives.

In various installations utilizing tubular conduits, such as pipes, it is ofttimes necessary to secure and seal these conduits within diverse partition members employed as partition walls, spacer walls or header plates. Typical of these installations are heat exchangers, fractionating columns, various pressure vessels, reactors, heaters, condensers, and feed water heaters for use in power generating stations. Sealing of the tubes within partition members is often critical in order to provide for the separation of different fluids. For example, in the feed water heaters, referred to above, the sealing of a plurality of condensate-feed water tubes becomes critical because of the possibility of condensate leaking through a partition member and corroding various metallic components. Another example of installations which requires the securement and sealing of tubular conduits within a partition member are the well known boilers in which a plurality of tubes are connected to a boiler shell plate wherein a heat exchange fluid flows through the conduits and whose external surfaces are heated by the direct application of an appropriate flame.

Although various methods are known for securing tubular conduits within partition members, they have suffered various disadvantages inherent in each method. For example, external elements have been employed to obtain the desired seal between the conduits and partition member, such as welds, however, they have either required elaborate sealing means or else a high degree of skill, such as in welding which are not only time consuming but are difficult particularly when the operator has to work in difficult or cramped quarters. Although the use of explosives has been proposed for securing the sealing of tubular conduits within partition members, such use has also required the requirement of a plurality of external elements for positioning the explosive within the tubular conduit and a separate element for confining the explosive force within the conduit and/or for transmitting the explosive force to the tubular conduit to be formed.

Accordingly, it is an object of this invention to eliminate disadvantages of the prior art.

Another object of this invention is to provide a novel and simplified process for bulging or expanding tubular conduits.

A still further object of this invention is to provide a novel and simplified process for securing tubular conduits within partition members.

A further object of this invention is to provide a novel and simplified process for providing a centering and force transmitting medium in the bulging of tubular conduits with explosives.

A still further object of this invention is to provide a novel and simplified process for securing and sealing tubular conduits to partition walls with an explosive force.

Other objects and advantages of this invention will become more apparent from the following description and drawings in which.

Figure 5:
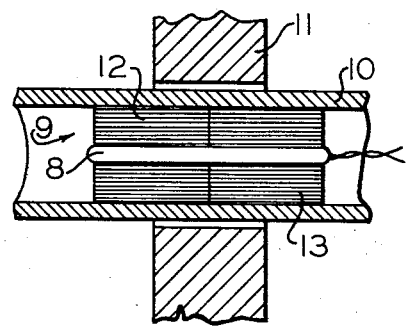
Figure 6:
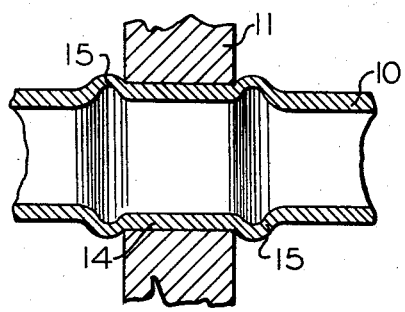

FIGURE 5 is a cross-sectional view of a tubular conduit disposed within an aperture of a partition member showing the positioning of an explosive charge in a tubular conduit in accordance with another embodiment of this invention; and FIGURE 6 is a cross-sectional view showing the type of securement and sealing obtained between a tubular conduit and a partition member in accordance with the embodiment illustrated in FIGURE 5.

Generally speaking, in accordance with this invention, a positioning and force transmitting means for an elongate explosive force is provided by winding a tape coated with an adhesive about an explosive charge with sufficient windings or convolutions to form an elongate cylindrical or annular ring of a dimension adapted to fit within the tube to be bulged or sized either freely without external restraint against bulging, or with restraint against the side walls of an aperture provided in a partition member, or any other similar device such as a die appropriately recessed to the configuration of the bulge desired to be imparted to the tubular conduit. The annular ring resulting from the winding or coiling of the adhesive tape about the explosive charge takes the form of a helically laminated annular ring having adjacent convolutions secured together with the adhesive of the tape, with the external convolution of the ring being directly contiguous with the interior surface of the tube.

The tapes contemplated and employed within the scope of this application are restricted to adhesive coated lengths of narrow strips or ribbons of non-metallic material such as paper, plastic, woven cotton and linen, and the like, having their surface coated with a suitable adhesive. Typical of these are a conventional friction or electrician tape, adhesive tape such as that employed for securing bandages to flesh, paper-backed pressure-sensitive tape commonly known as masking tape, and transparent cellophane-backed pressure-sensitive adhesive tape as exemplified in the type sold under the well known trade name of "Scotch Tape."

After the explosive charge has been suitably wound with the adhesive tape, the annular ring of adhesive tape is appropriately positioned within the tubular conduit to dispose and center the explosive charge in the portion of the conduit which is to be expanded or bulged. After positioning, the explosive charge is detonated with the force thereof transmitted through the annular ring of adhesive tape to the respective portion of the tubular conduit so as to expand and bulge it outwardly.

It is to be understood that the use of the adhesive tapes described above is only illustrative of the manner in which the formed annular ring is secured against unwinding, and that other tapes, such as elastic and other means of securement, are also contemplated to be embraced within this invention. For example, the convolutions of the tape forming the ring may be secured against unwinding by impregnating the tape with any suitable adhesive. This may be accomplished by winding the tape about a suitable forming means, such as a mandrel having a size and shape complimentary to the explosive charge to be employed. As above, the tape is wound about the forming means with sufficient convolutions to form an annular ring of a dimension adapted to fit within the tube to be bulged whereafter the ring is secured against unwinding by immersing it in a bath of an adhesive for a time sufficient to impregnate the ring. After drying the forming means is removed and the explosive placed within the axial opening of the ring and the assembly employed for the bulging of a tube in the manner described above.

In addition it is also to be understood that securement of the convolutions, of the ring, by mechanical means are also contemplated within this invention. In this embodiment a plain tape is wrapped about an explosive charge in the form of an annular ring, and the tail end of the tape is secured by suitable mechanical means, such as an additional wrapping with an adhesive tape or by means of a hook which attaches the tail end of the tape to the body of the annular ring.

Figure 1:
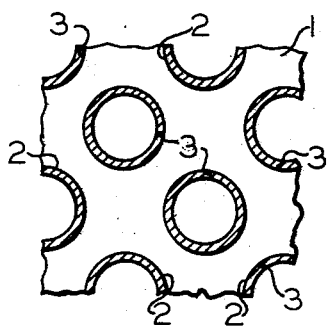
FIGURE 1 is a fragmentary view partly in section showing an assembly of tubular conduits disposed within a partition member for illustrating one embodiment of this invention.
Figure 2:
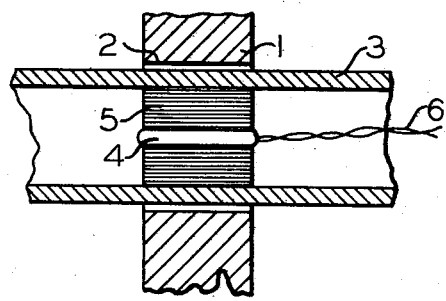
FIGURE 2 is a cross-sectional view of a tubular conduit disposed through an aperture of a partition member having an explosive charge appropriately positioned within the conduit in accordance with the one embodiment of this invention.
Figure 3:
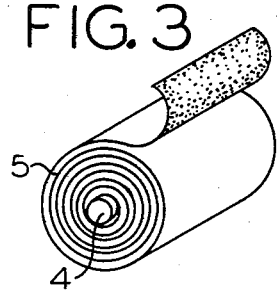
FIGURE 3 is a perspective view illustrating an element employed in the assembly of FIGURE 2 in accordance with the one embodiment of this invention.

More specifically, by reference to the drawings, a suitable partition member 1, such as a header plate of a heat exchanger, is provided with a plurality of apertures 2 into each of which is positioned a tubular conduit 3 which is desired to be secured in sealing relationship with the walls of the aperture. The tubular conduits may fit snugly within each of the apertures or they may be provided with other desired clearance between them to facilitate the positioning of the conduits through the partition member. For example, the partition member may be a ¾ inch steel header plate provided with $^{21}\!/_{32}$ of an inch apertures through which are inserted and positioned ⅝ inch diameter tubular conduits of 90-10 Monel metal with a $^{1}\!/_{16}$ inch wall thickness. As will be understood, although circular conduits and circular apertures are illustrated in FIGURE 1, there may be departures from such circular configurations, for example, either or both the aperture and the tubular conduit may have a polygonal shape such as hexagonal. In addition, the apertures may be polygonal and the conduits may be cylindrical, or the aperture may be circular with the conduits of a polygonal cross-sectional configuration.

Either prior to and preferably after positioning of the tubular conduit within the partition member, a suitable explosive charge 4 having a generally elongate configuration is centrally positioned within the tubular conduit 3 opposite the portion thereof which is to be deformed against the partition member 1 by means of a cylindrical annular ring 5 formed in accordance with this invention. As pointed out above, this ring is formed by winding an adhesive tape about the explosive charge with a sufficient number of convolutions necessary to form an annular ring adapted to fit within the tubular conduit 3. It will be observed that the outer convolution of the ring lies directly contiguous with the interior surface of the conduit 3, that is, in close proximity with the conduit inner surface and with no intervening obstruction, barrier or other structure.

After placement of the explosive charge within the tubular conduit by the positioning and force transmitting means of this invention, the explosive charge is appropriately detonated by means of lead wires 6 whereupon the explosive force is transmitted through the annular ring 5 to bulge the portion 7 of conduit 3 against the partition member 1 to secure and seal the tube within the aperture 2 of the partition member.

Figure 4:
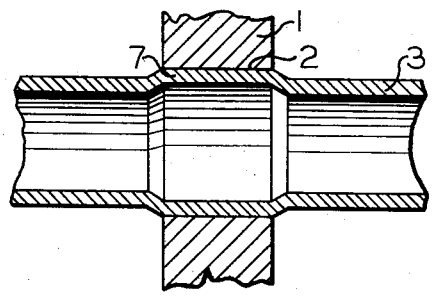
FIGURE 4 is a cross-sectional view illustrating one form of securement and sealing obtained between a tubular conduit and a partition member in accordance with the one embodiment of this invention.

In securing and sealing the above specifically described 90-10 Monel metal tube against the steel metal, the adhesive tape employed was a conventional and commercially available paper-backed pressure-sensitive masking tape, sold under the Scotch brand, employed in conjunction with an explosive force obtained from a 7.0 grain charge comprising 3.5 grains RDX, 3.0 grains azide, and 0.5 grain fulminate priming. In accordance with the above described embodiment of this invention, as shown in FIGURE 4, the tubular conduit was formed with an enlarged portion 7 secured and sealed against the partition member 1 with a degree of securement requiring about a 1500 pound force to remove the bulged tube from the partition member.

FIGURE 5 illustrates another embodiment of this invention utilizing an elongate explosive charge 8 positioned by means of a positioning and force transmitting medium 9 within a tubular conduit 10 wherein both the explosive charge and the medium are disposed opposite to and also extend on both sides of the partition member 11. This embodiment also illustrates a modification of the manner in which the adhesive tape may be wound about the explosive charge. As illustrated, two separate ribbons of an adhesive tape are wound about the explosive charge to form two separate annular rings 12 and 13 in abutting relationship with each other about the explosive charge. The explosive charge together with the annular rings of adhesive tape are then positioned within tubular conduit 10 with the outer convolution of the rings being directly contiguous with the exterior surface of the conduit in the same manner as described above for the previous embodiment, and the explosive charge is detonated. As illustrated in FIGURE 6, the tubular member 10 in addition to being expanded at the portion 14 against the partition member 11 is also bulged at 15 in the portion of the tube adjacent each side of partition member 11.

Although the invention has been described with reference to specific materials, embodiments and details, various modifications and changes, within the scope of the invention, will be apparent to one skilled in the art and are contemplated to be embraced within the invention.

What is claimed is:

1. In a method of bulging a portion of a tube with an elongate explosive charge positioned within and opposite said portion, the steps comprising providing a positioning and force transmitting means for said explosive charge by winding a tape of non-metallic material coated with an adhesive about said explosive charge with sufficient convolutions to form an elongate cylindrical annular ring of a dimension adapted to fit within said tube, positioning said ring within said tube with the external convolution of said ring being directly contiguous with the interior surface of said tube to dispose said explosive charge opposite said portion, and detonating said explosive charge to deform and bulge said portion.

2. The method of claim 1 wherein said tape is a ribbon of paper backed with a pressure-sensitive adhesive.

3. The method of claim 1 wherein said tape is a ribbon of transparent cellophane backed with a pressure-sensitive adhesive.

4. In a method of securing a tube within an aperture of a partition wall with an elongate explosive charge, the steps comprising providing a centering and force transmitting means for said explosive charge by winding a tape of non-metallic material coated with an adhesive about said explosive charge with sufficient convolutions to form an elongate cylindrical annular ring of a dimension adapted to fit within said tube, positioning said ring within said tube with the external convolution of said ring being directly contiguous with the interior surface of said tube to dispose said explosive charge in the portion of said tube contained within said aperture and opposite said wall, and detonating said explosive charge to deform, bulge and secure said portion within said aperture.

5. The method of claim 4 wherein said tape is a ribbon of paper backed with a pressure-sensitive adhesive.

6. The method of claim 4 wherein said tape is a ribbon of transparent cellophane backed with a pressure-sensitive adhesive.

7. In a method of bulging a portion of a tube with an elongate explosive charge positioned within said tube opposite said portion, the steps comprising providing a positioning and force transmitting means for said explosive charge by winding a tape of non-metallic material about said explosive charge with sufficient convolutions to form an elongate cylindrical annular ring of a dimension adapted to fit within said tube, with said ring secured against unwinding, positioning said ring within said tube with the external convolution of said ring being directly contiguous with the interior surface of said tube to dispose said explosive charge opposite said portion, and detonating said explosive charge to deform and bulge said portion.

8. The method of claim 7 wherein said ring is secured against unwinding by means of an adhesive coating on said tape.

9. The method of claim 7 wherein said ring is secured against unwinding by impregnating said ring with an adhesive.

10. The method of claim 7 wherein said ring is mechanically secured against unwinding.

11. In a method of bulging a portion of a tube with an elongate explosive charge positioned within said tube opposite said portion, the steps comprising providing a positioning and force transmitting means for said charge by coiling a tape of non-metallic material with sufficient convolutions in abutting relationship with each other to form an elongate cylindrical annular ring of a dimension adapted to fit within said tube and including an axial opening adapted to receive said charge with said ring secured against unwinding, placing said charge in said opening of said ring, positioning said ring within said tube with the external convolution of said ring being directly contiguous with the interior surface of said tube to dispose said charge opposite said portion, and detonating said charge to deform and bulge said portion.

12. The method of claim 11 wherein said ring is secured against unwinding by means of an adhesive coating on said tape.

13. The method of claim 11 wherein said ring is secured against unwinding by impregnating said ring with an adhesive.

14. The method of claim 11 wherein said ring is mechanically secured against unwinding.

References Cited in the file of this patent

UNITED STATES PATENTS

| | | |
|---|---|---|
| 1,457,625 | Freydberg | June 5, 1923 |
| 2,175,623 | Wilson | Oct. 10, 1939 |
| 2,667,689 | Parks | Feb. 2, 1954 |
| 2,822,290 | Webber | Feb. 4, 1958 |

FOREIGN PATENTS

| | | |
|---|---|---|
| 766,741 | Great Britain | Jan. 23, 1957 |